3,207,757
2-ARYL-6-AROYL-4,7-DIAMINO-PTERIDINES
Thomas S. Osdene, West Chester, Pa., assignor to American Home Products Corporation, New York, N.Y., a corporation of Delaware
No Drawing. Filed May 15, 1962, Ser. No. 195,003
4 Claims. (Cl. 260—251.5)

This invention relates to a new class of pteridine compounds having valuable pharmacological properties, and to a novel method of synthesizing these compounds. More particularly, it relates to a new class of aromatic basic ketones of the pteridine series and to their acid-addition salts with pharmaceutically acceptable acids.

The basic compounds of this invention may be represented by the formula

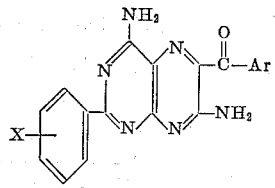

in which X represents hydrogen, chlorine, methyl, or methoxyl, and Ar represents an aryl radical which may be a phenyl or naphthyl radical or such a radical substituted by methyl, methoxy, or halogen. The substituent designated X may be positioned either ortho, meta, or para to the point of attachment of the benezene ring to the pteridine nucleus; where Ar is a naphthyl radical, it may be either α-naphthyl or β-naphthyl.

The above compounds have been found to be relatively non-toxic and to have valuable diuretic, anti-inflammatory, and anti-viral activity and are accordingly of value in both human and veterinary medicine. They may be administered orally or parenterally either as the bases of the formula shown or as the acid-addition salts of the bases with pharmaceutically acceptable acids such as hydrochloric, sulfuric, phosphoric, citric, maleic, and fumaric acids. The new compounds may be compounded with fillers, carriers, diluents, and coloring and/or flavoring agents, and formed into pills or tables, or filled into capsules for convenient administration of predetermined dosages.

The compounds of this invention may be prepared by a novel condensation between a 2-aryl-4,6-diamino-5-nitrosopyrimidine and an aroylacetonitrile, as schematically indicated in the following equation,

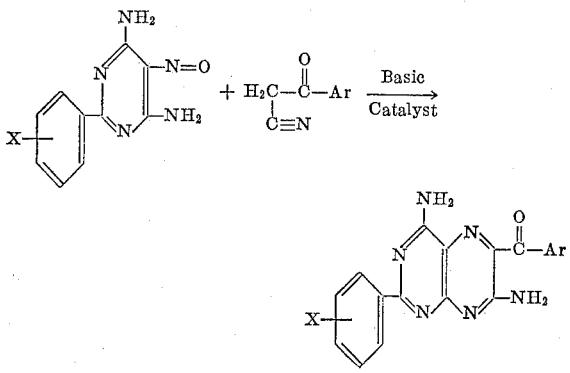

in which X and Ar have the meanings above given. As indicated, the above reaction proceeds as shown in the presence of a basic catalyst. I have found that this reaction is best conducted by heating the principal reactants together in an anhydrous neutral inert polar solvent containing a small amount of an alkali metal alkoxide or an alkali metal alkoxyalkoxide. Suitable neutrol inert polar solvents for this reaction include dimethyformamide, alcohols such as methanol, ethanol, isopropanol, n-butanol, and cyclohexanol, alkylene glycol monoalkyl ethers such as 2-methoxyethanol, 2-ethoxyethanol, 2-butoxyethanol, and lower alkoxypropanols, and even alkylene glycols such as ethylene glycol and propylene glycol. The desired pteridine-forming condensation reaction proceeds satisfactorily at temperatures between 50° C. and about 200° C., which means that in most cases it may be conducted at the boiling point of the solvent employed. The condensation reaction is ordinarily substantially complete after an hour or so of heating at 80° C., and often sooner especially when higher temperatures are employed.

The reaction solvent employed should be one in which the reactants and catalysts are reasonably soluble and from which the pteridine condensation product can be conveniently recovered. In many instances the pteridine condensation product separates as a solid and may merely be filtered off the cooled reaction mixture; in other cases it may be preferable to evaporate part of the solvent or to precipitate the product by dilution with water. If desired, mixtures of two or more solvents can be employed.

The following examples illustrate the preparation of compounds of this invention.

EXAMPLE 1

4,7-diamino-6-benzoyl-2-phenylpteridine

To a solution of 0.25 g. of sodium in 50 ml. of absolute ethanol is added 2.15 g. of 4,6-diamino-5-nitroso-2-phenylpyrimidine, followed by 1.6 g. of benzoylacetonitrile. The mixture is boiled under reflux for 1 hour during which time a bright yellow precipitate is deposited. Recrystallization from aqueous dimethylformamide affords 4,7-diamino-6-benzoyl-2-phenylpteridine as yellow crystals, M.P. 330–331° C.

Analysis.—Calculated: C=66.65; H=4.12; N=24.55. Found: C=66.62; H=4.02; N=23.90.

EXAMPLE 2

4,7-diamino-6-(β-naphthoyl)-2-phenylpteredine

To a solution of 0.2 g. of sodium in 500 ml. of absolute ethanol is added 6.54 g. of 4,6-diamino-5-nitroso-2-phenylpyrimidine. The mixture is stirred mechanically and boiled under reflux for 5 minutes, at which time 6.45 g. of 2-naphthoylacetonitrile is added. The solution is boiled under reflux for 2 hours during which time a yellow precipitate slowly deposits. After cooling, the precipitate is removed by filtration, and several recrystallizations from aqueous dimethylformamide afford 4,7-diamino-6-(β-naphthoyl)-2-phenylpteridine, M.P. 329° C.

Analysis.—Calculated: C=70.39; H=4.11; N=21.42. Found: C=70.63; H=4.36; N=21.20.

EXAMPLE 3

4,7-diamino-6-benzoyl-2-(o-tolyl)pteridine

To a solution of 0.2 g. of sodium in 500 ml. of absolute ethanol is added 6.87 g. of 4,6-diamino-5-nitroso-2-(o-tolyl)pyrimidine and the mixture is stirred and brought to the boil. This is followed by the addition of 4.8 g. of benzoylacetonitrile, and the mixture is then boiled under reflux for 2 hours. Slow deposition of a yellow precipiate occurs. After cooling, the precipitate is removed by filtration and recrystallized from aqueous dimethylformamine to give a 4,7-diamino-6-benzoyl-2-(o-tolyl)pteridine, M.P. 310° C.

Analysis.—Calculated: C=67.40; H=4.53; N=23.58. Found: C=67.29; H=4.71; N=23.55.

EXAMPLE 4

4.7 - diamino-6-benzoyl-2-(p-chlorophenyl)pteridine is prepared by the reaction of 4,6-diamino-2-(p-chlorophenyl)-5-nitrosopyrimidine with benzoylacetonitrile as shown in Example 3.

EXAMPLE 5

4,7 - diamino-6-benzoyl-2-(p-methoxyphenyl)-pteridine is prepared by the reaction of 4,6-diamino-2-(p-methoxyphenyl)-5-nitrosopyrimidine with benzoylacetonitrile as in Example 3.

EXAMPLE 6

4,7-diamino-6-benzoyl-2-(p-tolyl)pteridine is prepared by the reaction of 4,6-diamino-5-nitroso-2-(p-tolyl)-pyrimidine with benzoylacetonitrile as in Example 1.

EXAMPLE 7

4,7-diamino-6-(β-naphthoyl)-2-(p-tolyl)pteridine is prepared by the reaction of 4,6-diamino-5-nitroso-2-(p-tolyl) pyrimidine with 2-naphthoylacetonitrile as in Example 2.

EXAMPLE 8

4,7 - diamino-6-(β-naphthoyl)-2-(p-chlorophenyl)pteridine is obtained by the reaction of 4,6-diamino-2-(p-chlorophenyl)-5-nitrosopyrimidine with 2-naphthoylacetonitrile as in Example 2.

EXAMPLE 9

4,7-diamino-6-(β-naphthoyl) - 2 - (p-methoxyphenyl)-pteridine is prepared by the reaction of 4,6-diamino-2-(p-methoxyphenyl)-5-nitrosopyrimidine with 2-naphthoylacetonitrile as in Example 2.

EXAMPLE 10

4,7 - diamino-6-(β-naphthoyl)-2-(o-tolyl)pteridine is prepared by the reaction of 4,6-diamino-5-nitroso-2-(o-tolyl)pyrimidine with 2-naphthoylacetonitrile as in Example 2.

I claim:
1. A compound of the formula

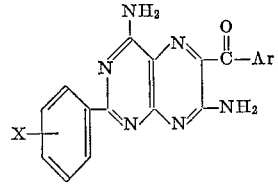

in which X is a member of the group consisting of hydrogen, chlorine, methyl, and methoxyl, and Ar is a member of the group consisting of phenyl and naphthyl.
2. 4,7-diamino-6-benzoyl-2-phenylpteridine.
3. 4,7-diamino-6-(β-naphthoyl)-2-phenyl pteridine.
4. 4,7-diamino-6-benzoyl-2-(o-tolyl)pteridine.

References Cited by the Examiner
UNITED STATES PATENTS

| | | | |
|---|---|---|---|
| 2,963,481 | 12/60 | Grannells et al. | 260—251.5 |
| 2,975,180 | 3/60 | Osdene | 260—251.5 |
| 2,998,420 | 8/61 | Weinstock | 260—251.5 |

NICHOLAS S. RIZZO, *Primary Examiner.*
IRVING MARCUS, *Examiner.*